UNITED STATES PATENT OFFICE.

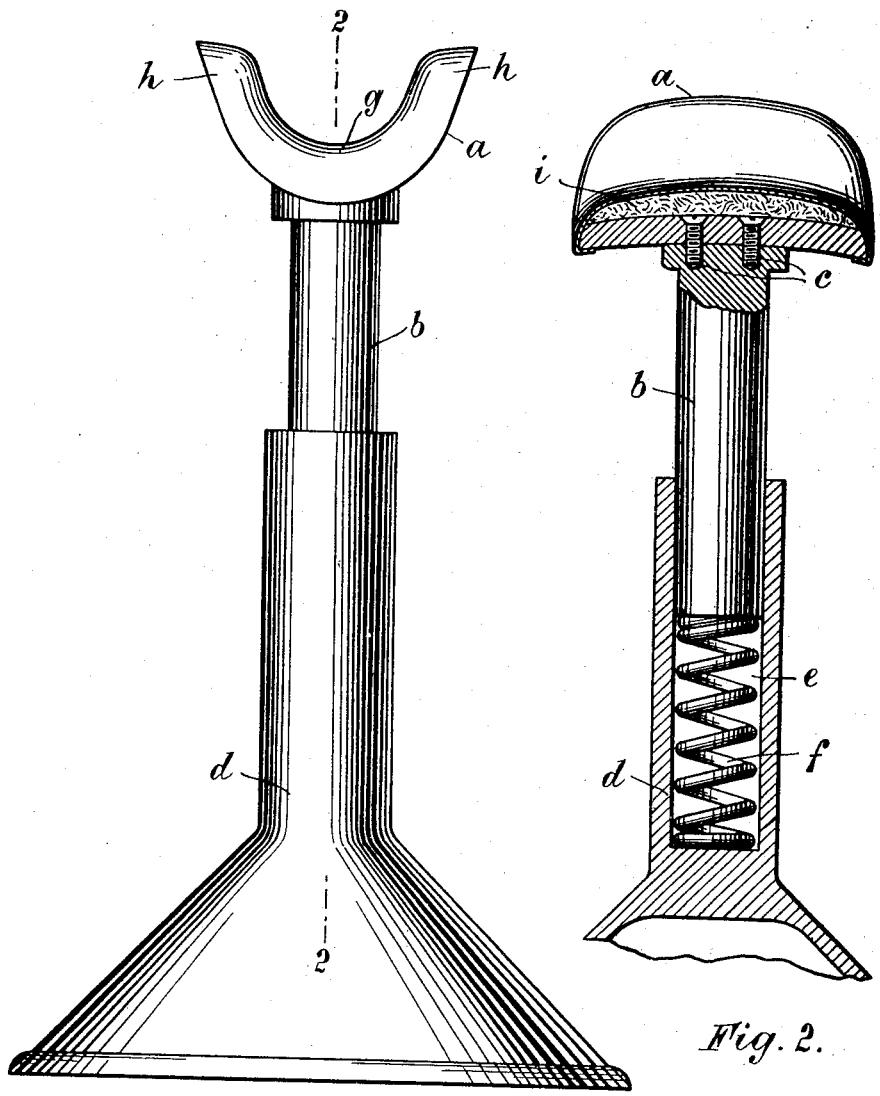

GEORGE F. MALTBY, OF HILLSBURGH, ONTARIO, CANADA.

SHOEING-JACK.

1,198,467. Specification of Letters Patent. Patented Sept. 19, 1916.

Application filed April 22, 1916. Serial No. 93,008.

*To all whom it may concern:*

Be it known that I, GEORGE F. MALTBY, of the town of Hillsburgh, in the county of Wellington, in the Province of Ontario, in the Dominion of Canada, have invented certain new and useful Improvements in Shoeing-Jacks, and do hereby declare that the following is a full, clear, and exact description of same.

This invention relates to shoeing jacks for the purpose of supporting the leg or hoof of a horse during the shoeing operation. Hitherto it has been known to provide devices for this purpose, such devices being in some cases adjustable but in all cases rigid when in use. It has been found, however, that owing to the fact that the average horse is used to having its leg manually supported during shoeing operations, difficulty has been experienced in the use of the type of shoeing jack as heretofore known owing to the horse being unaccustomed to the rigid support and therefore nervous, resulting in great loss of time to the farrier as the horse persists in moving about and often refuses to allow its leg to remain on the jack.

The objects of this invention are, therefore, to provide a shoeing jack which will support the leg of a horse in a manner resembling the manual support with which horses are acquainted and to provide a simple and efficient structure for this purpose.

In carrying the invention into effect I may provide the novel construction and arrangement of parts whereby the leg rest is carried by the upper end of a supporting stem, which stem is slidably mounted in a socket in the upper part of a rigid base or standard, a spring or other resilient member being disposed in the said socket, beneath the lower end of the said supporting stem, whereby said spring will be more or less compressed when the device is in use, the leg rest having a configuration and being upholstered in a manner calculated to receive a horse's leg in much the same manner as the leg of a horse is held between the knees of a farrier, in the old way, during a shoeing operation; all of which is more particularly described and ascertained in the following specification having reference to the accompanying drawing in which,—

Figure 1 is an elevation of the shoeing jack, and Fig. 2 is a section on the line 2—2 Fig. 1, the lower part of the standard being broken away.

Similar characters of reference indicate similar parts in both figures of the drawing.

$a$ is the leg rest and $b$ the supporting stem therefor upon which the rest $a$ may be rigidly or rotatably mounted as may be desired, the drawing showing the rest rigidly secured thereto by means of screws $c$.

$d$ is the base member of standard having a vertical socket $e$ therein to receive the stem $b$, while $f$ is a coiled spring situated within the socket $e$ and surmounted by the said stem $b$.

The leg rest $a$ in cross sectional configuration comprises the lower curved portion $g$ having lateral and synclinal sides $h$—$h$, which configuration adapts the rest to receive the leg of a horse in much the same manner as a horse's leg is held between the knees of a farrier when shoeing in the old and well known way, and to increase the resemblance to manual support, the rest $a$ is upholstered such as in the manner indicated at I, whereby a horse's leg is submitted to a slight wedge action due to the synclinal sides and augmented by the more or less resilient upholstering. It is, however, necessary that during the shoeing operation, particularly when the hoof is being hammered or shock otherwise imparted thereto, that such shock should be taken up in much the same manner as it is taken up when the horse's leg is manually supported and therefore a certain resiliency in the jack proper is necessary and this is provided by the spring $f$ on which the stem $b$ rests as will be readily understood.

By the use of a jack of the nature described, a horse being shoed does not become nervous owing to the unaccustomed manner of supporting the leg and incidentally is much more tractable than would otherwise be the case.

This invention may be developed within the scope of the following claims without departing from the essential features thereof and it is desired that the specification and drawing be read as being merely illustrative and not in a limiting sense, except as necessitated by the prior art.

What I claim as my invention is:

1. A shoeing jack comprising a leg rest and means resiliently supporting said rest whereby support for a horse's leg in a manner approximating manual support is provided.

2. A shoeing jack comprising a leg rest, upholstered synclinal lateral members forming the sides of said rest whereby a horse's leg may be naturally gripped between said lateral members, and means supporting said rest in a resilient manner.

3. In a shoeing jack, a leg rest, a support for said rest, and resilient means permitting the movement of said support when the jack is in use.

4. In a shoeing jack, a leg rest, a support for said rest, a base member in which said support is slidably mounted, and resilient means within said base member to control the sliding of said support.

Signed at the town of Hillsburgh, in the county of Wellington, in the Province of Ontario, in the Dominion of Canada, this 1st day of April, 1916.

GEORGE F. MALTBY.

Witnesses:
WILLIAM M. MALTBY,
M. J. ANDREWS.

Copies of this patent may be obtained for five cents each, by addressing the "Commissioner of Patents, Washington, D. C."